United States Patent
Ikeuchi et al.

(10) Patent No.: US 8,141,426 B2
(45) Date of Patent: Mar. 27, 2012

(54) DISPLACEMENT MEASUREMENT APPARATUS FOR MICROSTRUCTURE AND DISPLCEMENT MEASUREMENT METHOD THEREOF

(75) Inventors: Naoki Ikeuchi, Amagasaki (JP); Hisashi Fujiwara, Amagasaki (JP); Masami Yakabe, Minato-ku (JP); Masato Hayashi, Amagasaki (JP)

(73) Assignee: Tokyo Electron Limited, Minato-ku (JP)

( * ) Notice: Subject to any disclaimer, the term of this patent is extended or adjusted under 35 U.S.C. 154(b) by 581 days.

(21) Appl. No.: 12/315,742

(22) Filed: Dec. 5, 2008

(65) Prior Publication Data

US 2009/0145230 A1 Jun. 11, 2009

Related U.S. Application Data

(60) Provisional application No. 61/005,578, filed on Dec. 5, 2007.

(30) Foreign Application Priority Data

Dec. 5, 2007 (JP) .................... 2007-314451

(51) Int. Cl.
*G01P 15/125* (2006.01)
*G01P 9/04* (2006.01)
*G01C 19/56* (2006.01)

(52) U.S. Cl. ................ 73/514.32; 73/504.14; 73/504.12

(58) Field of Classification Search ............... 73/504.14, 73/514.32, 504.12, 504.04, 514.29, 514.36, 73/514.38, 1.79

See application file for complete search history.

(56) References Cited

U.S. PATENT DOCUMENTS

| | | | |
|---|---|---|---|
| 6,497,147 B2 * | 12/2002 | Kato et al. | 73/504.12 |
| 6,526,826 B2 * | 3/2003 | Kurachi et al. | 73/504.02 |
| 7,337,669 B2 * | 3/2008 | Nozoe | 73/514.16 |
| 7,434,466 B2 * | 10/2008 | Ito | 73/514.32 |
| 2007/0080695 A1 | 4/2007 | Morrell | |

FOREIGN PATENT DOCUMENTS

JP 2001-264355 9/2001

OTHER PUBLICATIONS

Contents of the Notice of Reason(s) for Rejection in JP Patent Application No. 2007-314451, Dispatched date: Nov. 17, 2009, Japan Patent Office.

* cited by examiner

Primary Examiner — Helen C. Kwok
(74) Attorney, Agent, or Firm — Masuvalley & Partners

(57) ABSTRACT

A displacement measurement apparatus for a microstructure according to the present invention measures a displacement of the microstructure having a fixed portion electrode including a first electrode and a second electrode and a movable portion electrode located oppositely to the fixed portion electrode. A bias generating circuit applies a bias signal to between the first electrode and the movable portion electrode so that influence of a noise signal on a detection signal picked up from between the second electrode and the movable portion electrode may be reduced. A C/V converting circuit converts a capacitance change that is picked up from between the second electrode and the movable portion electrode into a voltage. A detecting circuit detects a displacement of the movable portion electrode based on the voltage.

16 Claims, 5 Drawing Sheets

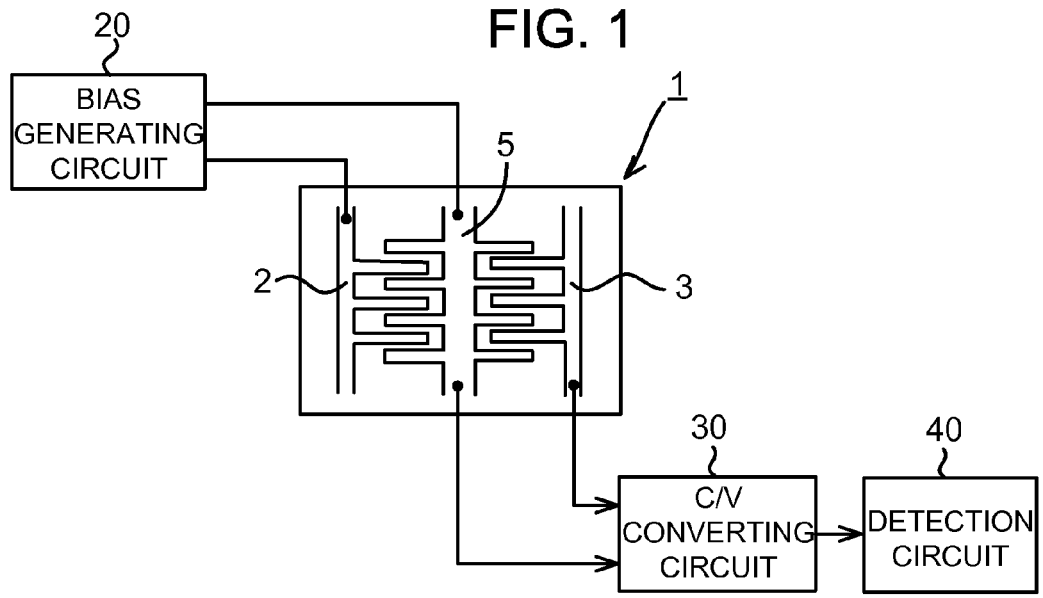
FIG. 1
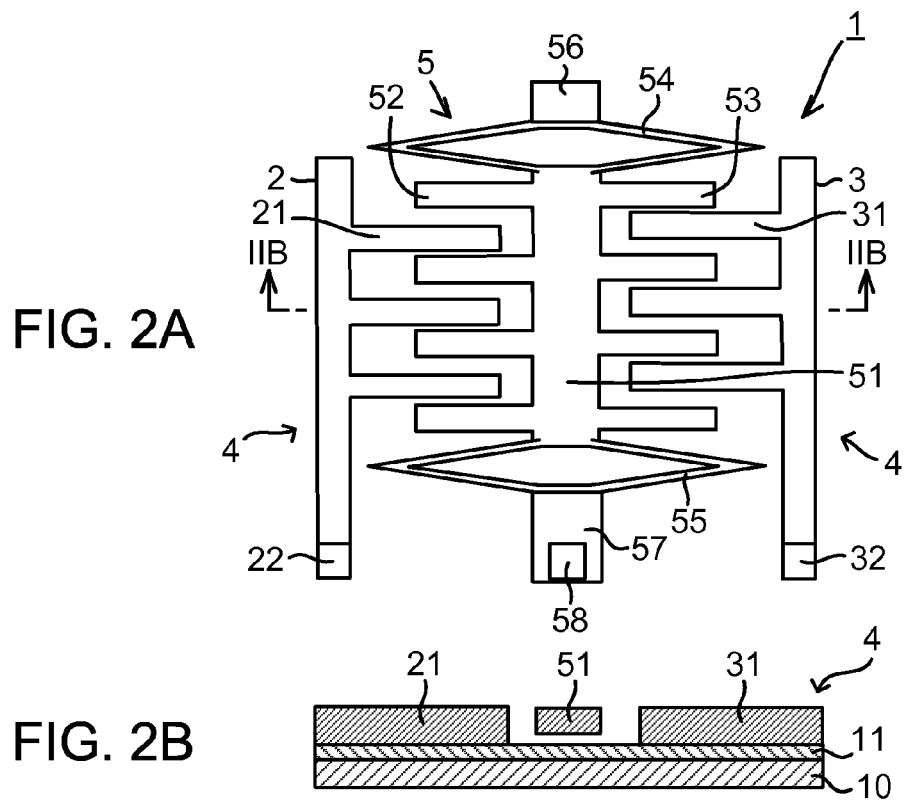
FIG. 2A
FIG. 2B

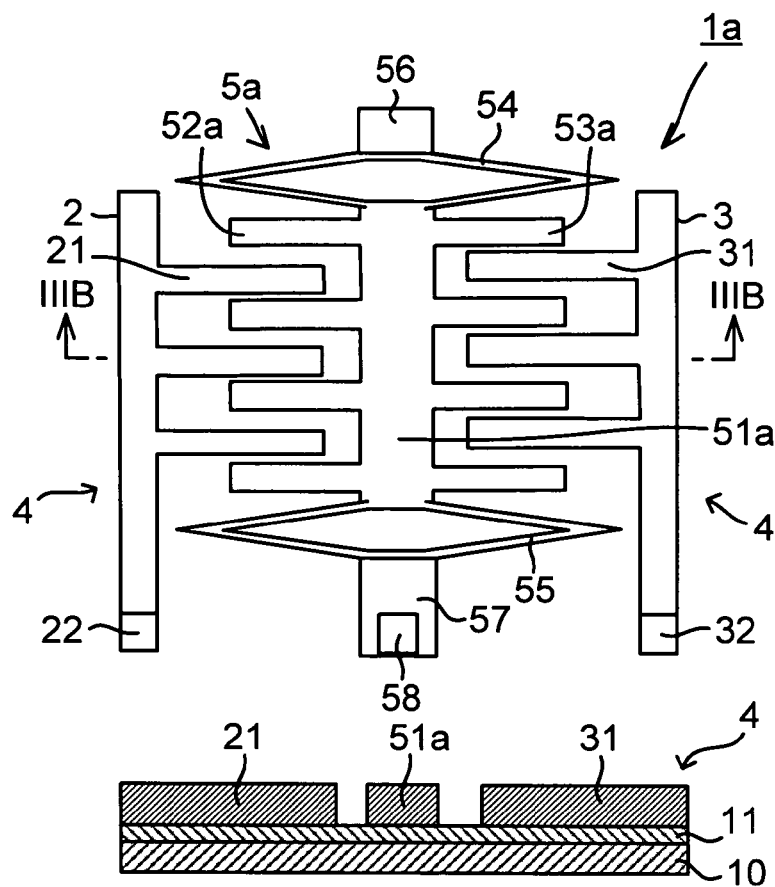
FIG. 3A
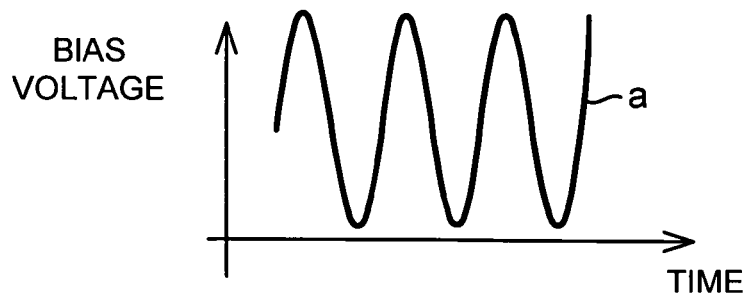
FIG. 3B
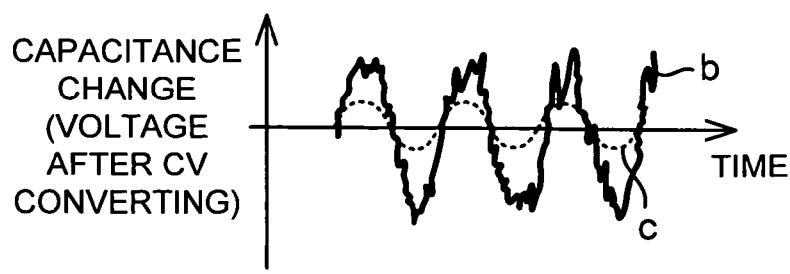
FIG. 4A
FIG. 4B

DISPLACEMENT MEASUREMENT APPARATUS FOR MICROSTRUCTURE AND DISPLCEMENT MEASUREMENT METHOD THEREOF

This application claims priority to U.S. Provisional Application Ser. No. 61/005,578, filed on Dec. 5, 2007, entitled "Displacement Measurement Apparatus for Microstructure and Measurement Method Thereof", which is incorporated herein by reference in its entirety.

TECHNICAL FIELD

The present invention relates to a displacement measurement apparatus for a microstructure, such as an acceleration sensor and an angular velocity sensor, and a displacement measurement method thereof.

BACKGROUND OF THE INVENTION

In recent years, multiaxis acceleration sensors and angular velocity sensors using MEMS (Micro Electro Mechanical System), for example, as microstructures are widely used in various fields such as airbags for cars. Various tests are performed to such microstructures to measure a sensor output etc.

A test method for a MEMS sensor is described in United States Patent Application Publication No. US 2007/0080695. In United States Patent Application Publication No. US 2007/0080695, an input signal is provided from an input signal generator for a fixed electrode that constitutes one electrode of capacitors of the MEMS sensor. An output signal outputted from a movable electrode that constitutes the other electrode is provided for a detection system. The MEMS sensor is vibrated by a vibration exciter. The detection system measures a resonance frequency, a constant of spring and a damping constant, etc.

In the test method described in United States Patent Application Publication No. US 2007/0080695, an external displacement source causes a test system to be complicated and high in cost. Especially, in the case of multiaxis acceleration sensors and multiaxis angular velocity sensors, necessity of displacing the sensors in respective detection axis directions causes a structure of the external displacement source to be more complicated. Further, the external displacement source displaces a movable portion indirectly via a supporting member of the microstructure and a supporting portion of the movable portion of the microstructure. Consequently, an impact time, intensity and phase applied to the movable portion cannot be controlled precisely. Therefore, measurement accuracy is not high.

Characteristics of the microstructure needs to be measured in a state that the microstructure is formed on a wafer. Although a measurement method for one MEMS sensor is described in United States Patent Application Publication No. US 2007/0080695, a measurement method for a MEMS sensor formed on a wafer is not described in United States Patent Application Publication No. US 2007/0080695. If the external displacement source, such as a vibration exciter etc. described in United States Patent Application Publication No. US 2007/0080695, displaces the wafer, the entire wafer is displaced from the outside. Then a probe contacting a surface of a pad vibrates. Consequently, there is a problem that a contact resistance varies during a measurement or an electric contact can not be achieved.

On the other hand, in a method that a movable electrode is electrostatically driven by application of bias between the movable electrode and a fixed electrode opposite to the movable electrode without using the external displacement source, afflux of the applied bias signal to a detection circuit as noise causes the measurement to be inaccurate.

A main object of the present invention is to provide a displacement measurement apparatus for a microstructure and a displacement measurement method thereof where no external displacement source is necessary and characteristics of a microstructure can be measured accurately.

SUMMARY OF THE INVENTION

In accordance with a first aspect of the invention, a displacement measurement apparatus for a microstructure having a fixed electrode including a first electrode and a second electrode and a movable electrode opposed to the fixed electrode includes:

a bias generator that applies a bias signal to the first electrode and the movable electrode; and a detector that detects a displacement of the movable electrode based on a first detection signal obtained from the second electrode and the movable electrode.

According to the first aspect of the present invention, the bias signal is applied to the first electrode and the movable electrode, and the first detection signal is picked up from the second electrode and the movable electrode. Namely, an electrode that the bias signal is applied to and an electrode that the detection signal is picked up from are separated. For this reason, the bias signal commingling into the second electrode can be reduced. Therefore, it is possible to measure characteristics of a microstructure accurately without using external displacement source.

In accordance with a second aspect of the invention, a displacement measurement method for a microstructure having a fixed electrode including a first electrode and a second electrode and a movable electrode opposed to the fixed electrode includes the steps of:

applying a bias signal to the first electrode and the movable electrode;

extracting a first detection signal from the second electrode and the movable electrode; and detecting a displacement of the movable electrode based on the first detection signal.

According to the second aspect of the present invention, the bias signal is applied to the first electrode and the movable electrode, and the first detection signal is picked up from the second electrode and the movable electrode. Namely, an electrode that the bias signal is applied to and an electrode that the detection signal is picked up from are separated. For this reason, the bias signal commingling into the second electrode can be reduced. Therefore, it is possible to measure characteristics of a microstructure accurately without using external displacement source.

In accordance with a third aspect of the invention, a displacement measurement method for a microstructure having a fixed electrode and a movable electrode opposed to the fixed electrode, the method comprising the steps of applying a bias signal to the fixed electrode and the movable electrode; and picking up a detection signal from the fixed electrode and the movable electrode so as to detect a displacement of the movable electrode;

wherein the bias signal is not applied while picking up the detection signal.

According to the third aspect of the present invention, in a case the microstructure as a measuring object has only one fixed electrode, it is possible to measure characteristics of the microstructure accurately without using external displacement source.

BRIEF DESCRIPTION OF THE DRAWINGS

FIG. 1 is a block diagram showing a displacement measurement apparatus for a microstructure of one embodiment of the present invention.

FIG. 2A and FIG. 2B are figures showing a structure of a microstructure shown in FIG. 1. FIG. 2A is an illustrated plan view, and FIG. 2B is a cross-sectional view taken along the line IIB-IIB of FIG. 2A.

FIG. 3A and FIG. 3B are figures showing a structure of a pseudo-microstructure that is used when a noise element is detected. FIG. 3A is an illustrated plan view, and FIG. 3B is a cross-sectional view taken along the line IIIB-IIIB of FIG. 3A.

FIG. 4A and FIG. 4B are waveform charts showing a bias voltage of a high-frequency wave bias signal and a capacitance change.

DETAILED DESCRIPTION OF INVENTION

Figure 5A:
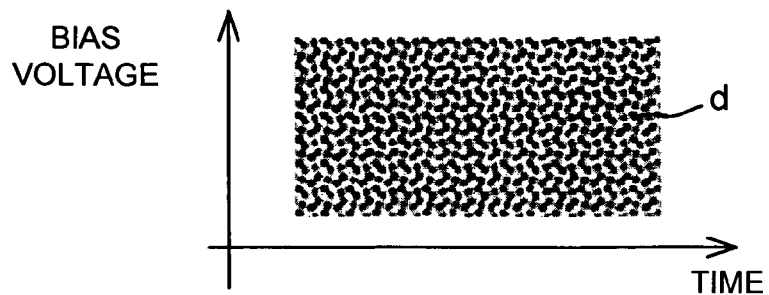
FIG. 5A and FIG. 5B are waveform charts showing a bias voltage of a white-noise bias signal and a capacitance change.

FIG. 1 is a block diagram showing a displacement measurement apparatus for a microstructure of preferable embodiment of the present invention. In FIG. 1, a microstructure 1, for example, is an acceleration sensor that detects an acceleration when velocity is applied from outside. The microstructure 1 includes a fixed portion electrode 4 including a first electrode 2 and a second electrode 3, and a movable portion electrode 5 located oppositely to the fixed portion electrode 4. In the microstructure 1, the movable portion electrode 5 and the fixed portion electrode 4 are horizontally located. The movable portion electrode 5 is displaced by a bias signal applied to between the first electrode 2 of the fixed portion electrode 4 and the movable portion electrode 5. A displacement signal is picked up as a detection signal from between the second electrode 3 of the fixed portion electrode 4 and the movable portion electrode 5. Such microstructures 1 are formed in large numbers on a wafer that is not shown in the figures.

Incidentally, the microstructure 1 shown in FIG. 1 is one example of an acceleration sensor where the direction to which the movable portion electrode 5 is displaced by the bias signal and the direction to which the movable portion electrode 5 is displaced by applying an acceleration are identical. When the bias signal is applied to between the first electrode 2 and the movable portion electrode 5 from a bias generating circuit 20 that operates as a bias signal applying means, the movable portion electrode 5 displaces. A capacitance change according to the displacement is picked up from between the second electrode 3 of the fixed portion electrode 4 and the movable portion electrode 5, and then the detection signal is provided to a C/V converting circuit 30. The C/V converting circuit 30 converts the capacitance change into a voltage change, then outputs the voltage change to a detecting circuit 40. The detection circuit 40 outputs a measurement signal according to the voltage change. The C/V converting circuit 30 and the detection circuit 40 operate as a detecting means, a synchronous detecting means and a first and second signal extracting means.

FIG. 2A and FIG. 2B show a structure of a microstructure shown in FIG. 1. FIG. 2A is an illustrated plan view, and FIG. 2B is a cross-sectional view taken along the line IIB-IIB of FIG. 2A. An oxidized insulating film 11 is formed on a substrate 10 shown in FIG. 2B. The microstructure 1 is formed on the oxidized insulating film 11.

Specifically, the movable portion electrode 5 shown in FIG. 1 includes a weight portion 51 of the movable portion electrode, a plurality of pectinate electrodes 52 of the movable portion, a plurality of pectinate electrodes 53 of the movable portion, movable springs 54 and 55, and anchor portions 56 and 57 in FIG. 2A and FIG. 2B. The weight portion 51 of the movable portion electrode connects to the pectinate electrodes. The plurality of pectinate electrodes 52 of the movable portion extend in a pectinate form in one direction that is orthogonal to a longitudinal direction of the weight portion 51 of the movable portion electrode. The plurality of pectinate electrodes 53 of the movable portion extend in another direction. The movable springs 54 and 55 support both ends of the weight portion 51 of the movable portion electrode. The anchor portions 56 and 57 fix the movable springs 54 and 55. Although the anchor portions 56 and 57 are fixed on the oxidized insulating film 11, the movable springs 54 and 55, the weight portion 51 of the movable portion electrode and the plurality of pectinate electrodes 52 and 53 of the movable portion are not fixed on the oxidized insulating film 11. Therefore, the movable springs 54 and 55, the weight portion 51 of the movable portion electrode and the plurality of pectinate electrodes 52 and 53 of the movable portion resonate when velocity is increased.

The first electrode 2 and the second electrode 3 of the fixed portion electrode 4 are respectively located separately, and are formed on the oxidized insulating layer 11 so that the movable portion electrode 5 is located between the fixed portion electrodes. The first electrode 2 includes a pectinate portion 21 of the fixed portion that is located between the plurality of pectinate electrodes 52 of the movable portion extending from one side of the weight portion 51 of the movable portion electrode of the movable portion electrode 5. The second electrode 3 includes a pectinate portion 31 of the fixed portion that is located between the plurality of pectinate electrodes 53 of the movable portion extending from the other side of the weight portion 51 of the movable portion electrode of the movable portion electrode 5.

Intervals between the pectinate portions 21 and the pectinate electrodes 52 of the movable portion are arranged to be wide in an upper side and narrow in a lower side. To the contrary, intervals between the pectinate portions 31 and the pectinate electrodes 53 of the movable portion are arranged to be narrow in an upper side and wide in a lower side. Capacitance value between two electrodes is greater when distance between the two electrodes is narrower. In case of the same distance change, the capacitance value changes greater when the initial distance between the two electrodes is narrower.

Therefore, the capacitance value change between the pectinate portions 21 and the pectinate electrodes 52 is dominantly effected by the distance change between the two electrodes in the lower side. To the contrary, the capacitance value change between the pectinate portions 31 and the pectinate electrodes 53 is dominantly effected by the distance change between the two electrodes in the upper side.

When acceleration is applied to the longitudinal direction of the weight portion 51 of the movable portion electrode, and therefore the weight portion 51 of the movable portion electrode and the pectinate electrodes 52 and 53 of the movable portion are displaced for the paper-based upper direction, the capacitance value between the pectinate portions 21 and the pectinate electrodes 52 of the movable portion increases, the capacitance value between the pectinate portions 31 and the pectinate electrodes 53 of the movable portion decreases, and vice versa. Monitoring a difference of the capacitance values of the both sides makes it possible to monitor the displacement of the movable portion due to inertial force, namely an indicator of the acceleration. This is the operation of the microstructure 1 as an acceleration sensor.

A bias applying pad 22 is formed on one end of the first electrode 2. A detecting electrode 32 is formed on one end of the second electrode 3. A movable portion electrode pad 58 is formed on an anchor portion 57 of the movable portion electrode 5. A probe of a probe card that is not shown in figures contacts these pads 22, 32 and 58, and then applies the bias signal or takes out the detection signal.

A bias output outputted from the bias generating circuit 20 shown in FIG. 1 is inputted to the bias applying pad 22 and the movable portion electrode pad 58. Then bias is applied to the pectinate portions 21 and the pectinate electrodes 52 of the movable portion. A signal input terminal of the C/V converting circuit is connected to the detecting electrode 32 and the movable portion electrode pad 58. When the bias signal is applied to between the first electrode 2 and the movable portion electrode 5, the movable portion electrode 5 displaces, capacitance between the second electrode 3 and the movable portion electrode 5 changes, and the detection signal according to the displacement of the movable portion electrode arises.

FIG. 3A and FIG. 3B show a structure of a pseudo-microstructure 1*a* that is used when a noise element is detected. FIG. 3A is an illustrated plan view, and FIG. 3B is a cross-sectional view taken along the line IIIB-IIIB of FIG. 3A. The pseudo-microstructure 1*a* is provided separately from the microstructure 1 shown in FIG. 2A and FIG. 2B. The pseudo-microstructure 1*a* has the same structure and is located in the same positional relationship. The only difference is that a pseudo-weight portion 51*a* and pseudo-pectinate electrodes 52*a* and 53*a* of movable portion are fixedly formed on the oxidized insulating film 11. In the pseudo-weight portion 51*a*, a pseudo-movable portion electrode 5*a* does not displace even though the bias signal is applied to between the first electrode 2 and the pseudo-movable portion electrode 5*a*. Because a leakage element of the bias signal arises at the second electrode 3 via the pseudo-movable portion electrode 5*a*, the leak element of the bias signal can be picked up from the second electrode 3 as a noise element.

FIG. 4A and FIG. 4B are waveform charts showing a bias voltage of an alternating current signal and a capacitance change between the second electrode 3 and the movable portion electrode 5. The bias voltage of an alternating current signal is applied to between the first electrode 2 and the movable portion electrode 5. The capacitance change between the second electrode 3 and the movable portion electrode 5 is included in a detection signal taken out from between the second electrode 3 and the movable portion electrode 5.

Next, a description will be given of the operation of the measurement apparatus for the microstructure in one embodiment of the present invention. The bias generating circuit 20 outputs an alternating bias signal "a" in which electric voltage temporally changes as shown in FIG. 4A. The bias generating circuit 20 applies the alternating bias signal "a" to between the first electrode 2 of the fixed portion electrode 4 and the movable portion electrode 5. Then, The bias generating circuit 20 electrostatically drives the movable portion electrode 5 forcefully by electrostatic attractive force with desired displacement. At this time, the capacitance between the pectinate portion 31 and the pectinate electrodes 53 of the movable portion that are opposed with each other changes. The C/V converting circuit 30 converts a capacitance change "b" of a capacitance shown in FIG. 4B into a voltage change. The detecting circuit 40 detects a displacement amount based on the voltage change.

Here, as shown in FIG. 4A and FIG. 4B, the capacitance change "b" is picked up while the alternating bias signal "a" is applied. In other words, the detecting circuit 40 simultaneously detects the displacement amount of the movable portion electrode 5 while the bias generating circuit 20 applies the alternating bias signal "a".

Incidentally, the alternating current may be a signal in which electric voltage temporally changes, such as a sign-wave signal, a square wave signal and a triangular-wave signal. In this case, driving the movable portion electrode 5 at a resonance frequency of an expansion and contraction movement of the movable springs 54 and 55 of the movable portion electrode 5 makes it possible to obtain the displacement of the movable portion more efficiently.

As described above, it is possible to apply the bias signal to between the first electrode 2 and the movable portion electrode 5, and to pick up the capacitance change of the movable portion electrode 5 from between the second electrode 3 and the movable portion electrode 5. Therefore, separating an electrode that the bias signal is applied to and an electrode that the detection signal is picked up from makes it possible to reduce the bias signal commingling into the movable portion device, and to measure characteristics of a microstructure accurately without using external displacement source.

Further, separating an electrode that the bias signal is applied to from an electrode that the detection signal is picked up from enables the detecting circuit 40 to detect the displacement amount of the movable portion electrode 5 while the bias generating circuit 20 applies the bias signal. For this reason, it is not necessary to adopt a method, for example, that the detecting circuit 40 starts detecting the displacement amount after the bias generating circuit 20 has stopped applying the bias signal. Namely, it is not necessary to switch the application of the bias signal and the start of the detection as just described. Therefore, a time lag that is required for switching can be reduced, resulting in reducing time for detecting the displacement amount totally.

However, because a noise element "c" is contained in a signal that is observed after performing the CV-conversion of the capacitance change "b" shown in FIG. 4B, a precise measurement cannot be performed. Here, the noise element "c" arises from the alternating bias signal "a" that is applied to between the first electrode 2 and the movable portion electrode 5 commingling into the second electrode 3 via the movable portion electrode 5. Therefore, a description will be given of a method for detecting the true displacement signal of the movable portion electrode 5 with eliminating the noise content "c" from the capacitance change "b".

The bias generating circuit 20 and the C/V converting circuit 30 are connected to the pseudo-microstructure 1a shown in FIG. 3A and FIG. 3B instead of the microstructure 1 shown in FIG. 2A and FIG. 2B. The bias generating circuit 20 outputs the alternating bias signal and applies the bias voltage "a" shown in the FIG. 4A to between the first electrode 2 and the pseudo-movable portion electrode 5a. However, the pseudo-movable portion electrode 5a does not displace because the weight portion 51a of the movable portion electrode of the pseudo-movable portion electrode 5a and the pectinate electrodes 52a and 53a of movable portion are fixed onto the oxidized insulating film 11. The alternating bias signal "a" leaks to the second electrode 3 as the noise element "c" via the pseudo-movable portion electrode 5a. This noise element is converted into the voltage by the C/V converting circuit 30. Then a voltage value of the noise element is detected by the detecting circuit 40. Subtracting the noise element "c" from the converted voltage value of the capacitance change "b" detected by the above-mentioned microstructure 1 makes it possible to detect a converted voltage value of the capacitance change that does not contain the noise content "c". Accordingly, the true displacement signal of the movable portion electrode 5 can be detected.

In this way, detecting the noise element commingling into the second electrode 3 in advance and subtracting the noise content from the converted voltage of the detected capacitance change "b" make it possible to detect the true displacement signal of the movable portion electrode 5. Therefore, characteristics of the microstructure 1 can be measured accurately.

Figure 5B:
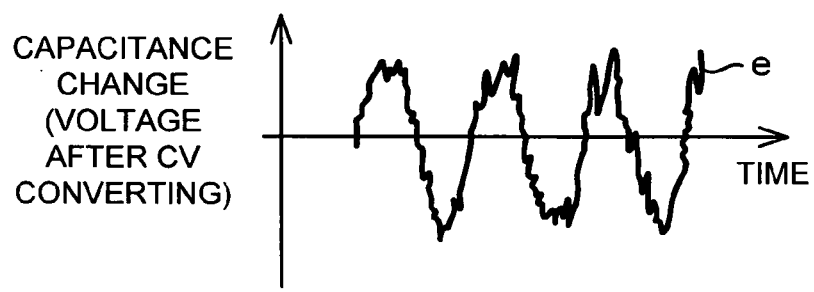

FIG. 5A and FIG. 5B are waveform charts for explaining an embodiment in which white-noise is employed as a random signal. The bias generating circuit 20 generates a bias signal of white-noise shown in FIG. 5A, and applies a bias voltage "d" to the first electrode 2. The white-noise is noise that ranges through a wide frequency band with uniform energy. When the white-noise is applied as the bias signal to between the first electrode 2 and the movable portion electrode 5, the movable portion electrode 5 resonates by consuming its own resonance frequency element included in the white-noise signal. The C/V converting circuit 30 converts a capacitance change "e" that arises between the second electrode 3 and the movable portion electrode 5 shown in FIG. 5B into a voltage. The detecting circuit 40 analyzes the frequency element based on the voltage change provided from the C/V converting circuit 30. This enables the detecting circuit 40 to detect the resonance frequency and its amplitude.

Here, as shown in FIG. 5A and FIG. 5B, the capacitance change "e" is picked up while the alternating bias signal "d" is applied. In other words, the detecting circuit 40 simultaneously detects the resonance frequency and its amplitude while the bias generating circuit 20 applies the bias voltage "d".

According to this embodiment, because the detection signal becomes a signal in which the resonance frequency of the microstructure is emphasized due to the employment of the white-noise as the bias signal, frequency characteristic arising from the resonance can be obtained. This enables a measurement of a resonance frequency and a measurement of a Q-value with a good S/N ratio. Q-value is an index showing a sharpness of a resonance peak.

Further, separating an electrode that the bias signal is applied to from the electrode that the detection signal is picked up from enables the detecting circuit 40 to detect the displacement amount of the movable portion electrode 5 while the bias generating circuit 20 applies the bias signal. For this reason, it is not necessary to adopt a method, for example, that the detecting circuit 40 starts detecting the displacement amount after the bias generating circuit 20 has stopped applying the bias signal. Namely, it is not necessary to switch the application of the bias signal and the start of the detection as just described. Therefore, a time lag that is required for switching can be reduced, resulting in reducing time for detecting the displacement amount totally.

FIG. 6A to FIG. 8B are waveform charts for explaining an embodiment in which a bias signal is applied until a movable portion electrode 5 starts moving and the application of the bias signal is stopped after the movable portion electrode 5 has started moving.

Figure 6A:
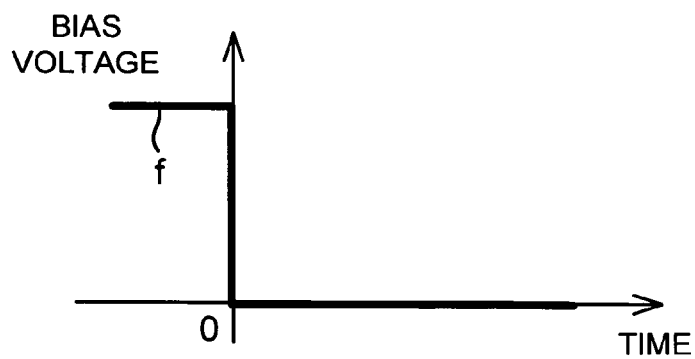
FIG. 6A and FIG. 6B are waveform charts for explaining an embodiment in which a movable portion electrode is compulsory displaced and a level of a direct current bias signal is changed.
Figure 6B:
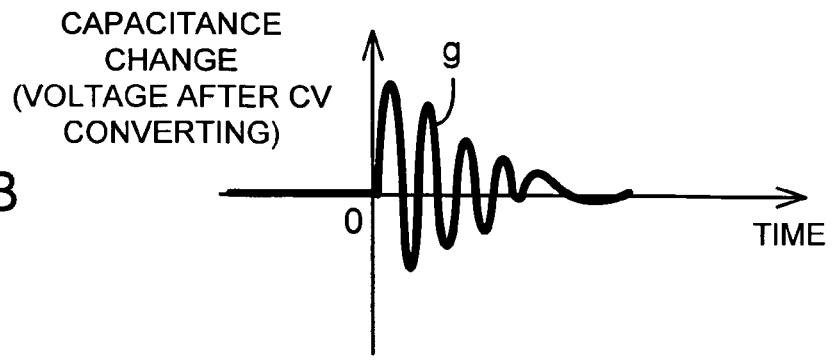

The bias generating circuit 20 generates a direct current bias signal having a predetermined voltage as shown in FIG. 6A, and applies the bias voltage "f" to between the first electrode 2 and the movable portion electrode 5. This keeps the movable portion electrode 5 forcefully displaced. At a time 0, the direct current bias signal is changed to 0 or another level. The movable portion electrode 5 loses its forced power when the level of the direct current signal has changed. The movable portion electrode 5 that lost its forced power starts freely oscillating so as to restore its position by restoring force of movable springs 54 and 55 that are components of the movable portion electrode 5. Because an oscillation of the movable portion electrode 5 is damped as time advances, a capacitance change "g" between the movable portion electrode 5 and the second electrode 3 is damped as shown in FIG. 6B. The detecting circuit 40 analyzes the freely-oscillating waveform from the time 0 when the application of the direct current bias signal stopped based on the voltage change converted by the C/V converting circuit 30. Further, the detecting circuit 40 measures the capacitance change and detects a resonance frequency, a damping characteristic or Q-value.

Here, as shown in FIG. 6A and FIG. 6B, the capacitance change "g" is picked up simultaneously with starting to apply the bias voltage "f". (However, a zero capacitance change "g" is picked up during a period from the start of the bias application to the time 0.) In other words, the detecting circuit 40 starts detecting the resonance frequency, the damping characteristic or the Q-value simultaneously with the bias generating circuit 20 starting to apply the bias voltage "f". For this reason, a time lag to the start of the detection can be reduced in comparison with a method that the detecting circuit 40 starts detecting the resonance frequency, etc. after the bias generating circuit 20 has stopped applying the bias signal at the time 0.

Figure 7A:
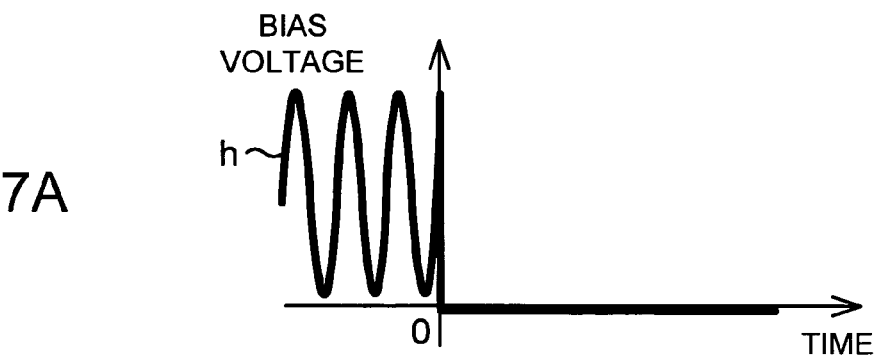
FIG. 7A and FIG. 7B are waveform charts for explaining an embodiment in which an alternating current bias signal is applied until a movable portion electrode starts moving and the application of alternating current bias signal is stopped after the movable portion electrode has started moving.
Figure 7B:
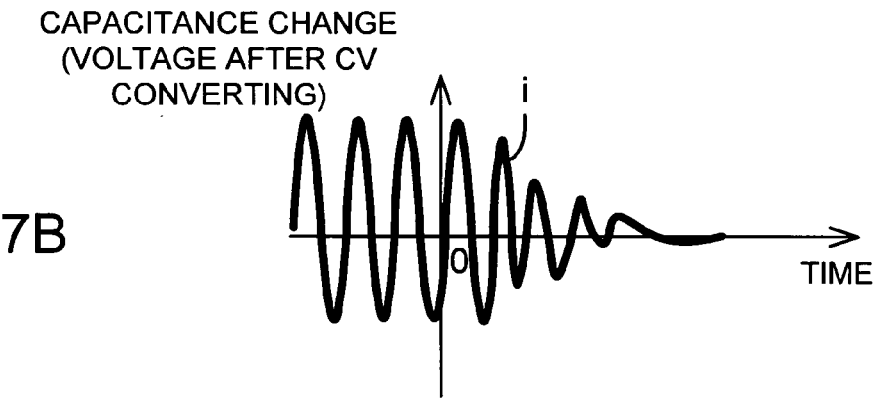

In contrast to the employment of the direct current bias voltage as the bias signal in the explanation of FIG. 6A and FIG. 6B, an alternating current bias voltage is employed in FIG. 7A and FIG. 7B. Application of the alternating current bias voltage stops after the movable portion electrode 5 has started moving at the time 0. Specifically, the bias generating circuit 20 generates the alternating current bias signal, and applies a bias voltage "h" to between the first electrode 2 and the movable portion electrode 5 shown in FIG. 7A. In this occasion, such an alternating current bias signal should preferably be selected that has a frequency that resonates the movable portion electrode 5 at an expected resonance frequency.

The bias generating circuit 20 changes the bias voltage "h" of the alternating current bias signal to 0V or another certain level of direct current at a time 0 after the application of the alternating current bias signal has stopped. The movable portion electrode 5 keeps oscillating according to the bias voltage while the alternating current bias signal is being applied to between the first electrode 2 and the movable portion electrode 5. However, the movable portion electrode 5 loses its forced power when the application of the bias voltage stops. The movable portion electrode 5 that lost its forced power starts freely oscillating so as to restore its position by restoring force of movable springs 54 and 55. Finally, the movable portion electrode 5 finishes its free oscillation with its oscillation damped. The detecting part 40 detects a capacitance change "i" shown in FIG. 7B from the time the bias is applied to the time the free oscillation is finished through the time 0. Further, the detecting circuit 40 analyzes the freely-oscillating waveform from the time 0, measures the capacitance change and detects a resonance frequency, a damping property and Q-value.

Here, as shown in FIG. 7A and FIG. 7B, the capacitance change "i" is picked up simultaneously with starting to apply the bias voltage "h". (However, a zero capacitance change "i" is picked up during a period from the start of the bias application to the time 0.) In other words, the detecting circuit 40 starts detecting the resonance frequency, the damping property and the Q-value simultaneously with the bias generating circuit 20 starting to apply the bias voltage "h". For this reason, a time lag to the start of the detection can be reduced in comparison with a method that the detecting circuit 40 starts detecting the resonance frequency, etc. after the bias generating circuit 20 has stopped applying the bias signal at the time 0.

Figure 8A:
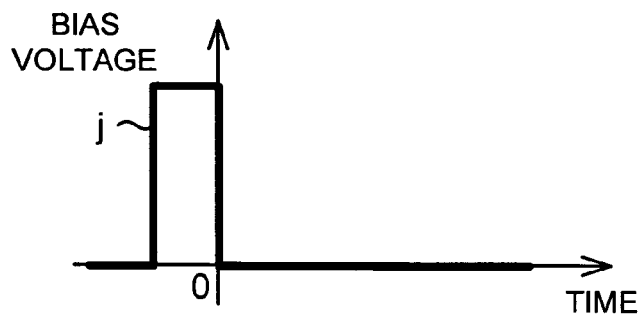
FIG. 8A and FIG. 8B are waveform charts for explaining an embodiment in which 1 pulse bias signal is applied until a movable portion electrode starts moving and the application of the 1 pulse bias signal is stopped after the movable portion electrode has started moving.
Figure 8B:
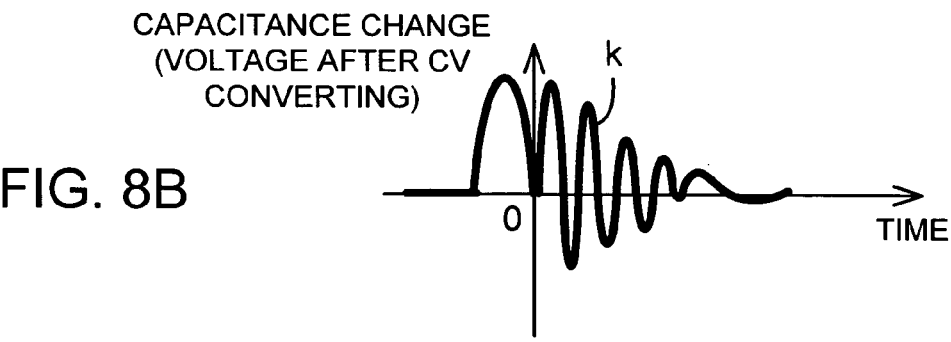

FIG. 8A and FIG. 8B show an embodiment in which a 1 (one) pulse bias signal is applied until the movable portion electrode 5 starts moving at a time 0. The bias generating circuit 20 generates the 1 (one) pulse bias signal that rises to a predetermined level and falls down at the time 0. The bias generating circuit 20 applies a bias voltage "j" shown in FIG. 8A to between the first electrode 2 and the movable portion electrode 5, resulting in oscillating the movable portion electrode 5 mandatorily. After the time 0, because the bias signal is not applied, the movable portion electrode 5 that lost its forced power starts freely oscillating so as to restore its position by restoring force of movable springs 54 and 55. Then, the movable portion electrode 5 finishes its free oscillation with its damped oscillation. The detecting part 40 detects a capacitance change "k" shown in FIG. 8B from the time the bias is applied to the time the free oscillation is finished through the time 0. Further, the detecting circuit 40 analyzes the freely-oscillating waveform from the time 0, measures the capacitance change, and detects a resonance frequency, a damping property and Q-value. It is preferable to select a resonance frequency cycle to be a pulse width of the 1 pulse.

Here, as shown in FIG. 8A and FIG. 8B, the capacitance change "k" is picked up simultaneously with starting to apply the bias voltage "j". In other words, the detecting circuit 40 starts detecting the resonance frequency, the damping property and the Q-value simultaneously with the bias generating circuit 20 starting to apply the bias voltage "j". For this reason, a time lag to the start of the detection can be reduced in comparison with a method that the detecting circuit 40 starts detecting the resonance frequency, etc. after the bias generating circuit 20 has stopped applying the bias signal at the time 0.

Incidentally, although the microstructure 1 shown in FIG. 2A and FIG. 2B has the first electrode 2 and the second electrode 3 separately as the fixed electrode 4, it is possible to provide only one of the electrodes. In this case, it is only necessary to alternate the timing of applying the bias signal with the timing of taking out the detection signal.

Further, it is also possible to detect a noise arising from a resonance of the movable portion electrode 5. This is achieved by detecting a capacitance between the second electrode 3 and the movable portion electrode 5 after applying a bias voltage to between the first electrode 2 and the movable portion electrode 5, detecting a capacitance between the first electrode 2 and the movable portion electrode 5 after applying a bias voltage to between the second electrode 3 and the movable portion electrode 5 and then detecting a difference of these detected capacitances in the same phase.

Figure 9:
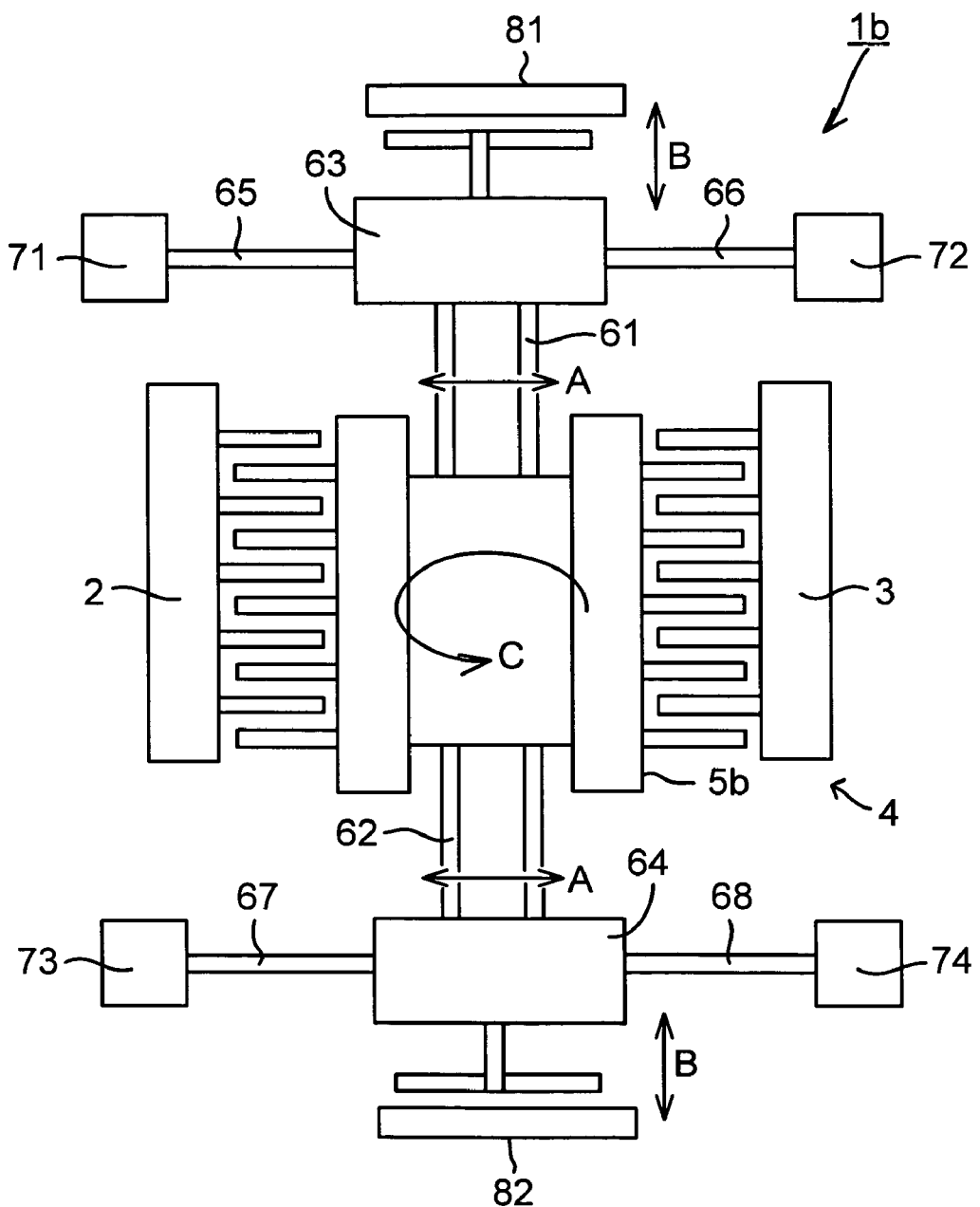
FIG. 9 is a plan view showing a microstructure of another embodiment of the present invention.

FIG. 9 is a plan view showing a microstructure 1b of another embodiment of the present invention. The microstructure 1 shown in FIG. 2A and FIG. 2B is an acceleration sensor. Meanwhile, the microstructure 1b is an angular velocity sensor. An acceleration sensor is a sensor in which the movable portion electrode having a weight portion displaces for a direction of the acceleration when the acceleration is applied. Meanwhile, an angular velocity sensor is a sensor that constantly excites the movable portion electrode and displaces the movable portion for the direction perpendicular to the excitation direction by Coriolis force arising in the movable portion electrode when an angular velocity is applied. In an acceleration sensor, a direction for which the movable portion electrode displaces by the bias signal of the present invention and a direction for which the movable portion electrode displaces when an acceleration is applied are the same. Meanwhile, in an angular velocity sensor, it is necessary to measure characteristics in a state that the movable portion electrode is excited and by displacing the movable portion electrode by electrostatic attractive force for a direction for which the movable portion electrode displaces when an angular velocity is applied.

Referring to FIG. 9, more specific explanation will be given of the microstructure 1b such as an angular velocity sensor. The microstructure 1b such as an angular velocity sensor includes the first electrode 2 and the second electrode 3 of the fixed portion electrode 4 and the movable portion electrode 5b. These elements are configured in the same way as the microstructure 1 shown in FIG. 1. The movable portion electrode 5b is connected to connecting members 63 and 64 via exciting springs 61 and 62. The connecting members 63 and 64 are supported by anchor portions 71, 72, 73 and 74 via detecting springs 65, 66, 67 and 68. A third electrode 81 and a fourth electrode 82 are provided oppositely to the connecting members 63 and 64.

Unlike the acceleration sensor shown in FIG. 2A and FIG. 2B, intervals in the up and down direction between a pectinate electrode of the movable portion electrode 5b and a pectinate portion of the first electrode 2 are arranged to be the same. This is because the movable portion is displaced for a direction of an arrow A by bias application, instead of the direction of an arrow "B" shown in FIG. 9 of the paper. It is the same for intervals in the up and down direction between a pectinate electrode of the movable portion electrode 5b and a pectinate portion of the second electrode 3. The movable portion electrode 5b is excited for the direction of the arrow "A" shown in FIG. 9 due to a bias applied to between the first electrode 2 and the movable portion electrode 5b. In this state, when a rotative force is applied for a direction of an arrow C, the movable portion electrode 5b is displaced for the direction of an arrow B by Coriolis force. A capacitance change detected between the second electrode 3 and the movable portion electrode 5b and between the fourth electrode 82 and the movable portion electrode 5b includes displacement elements caused by the rotation. The detecting circuit 40 detects an angular velocity based on these displacement contents.

Like the explanation for FIG. 1, when the bias signal is applied to between the first electrode 2 and the movable portion electrode 5b from the bias generating circuit 20, the movable portion electrode 5b displaces for the direction of the arrow A shown in FIG. 9. If the bias signal is configured to have a frequency that resonates the movable portion for the direction of the arrow "A" by restoring force of the exciting springs 61 and 62, the movable portion electrode 5b displaces for the direction of the arrow B. A capacitance change of the movable portion electrode 5b and the fixed portion electrode 4 is detected between the second electrode 3 and the movable portion electrode 5b. On the other hand, when the bias signal is applied to between the third electrode 81 and the movable portion electrode 5b, the movable portion electrode 5b displaces for the direction of the arrow B. A capacitance change between the movable portion electrode 5b displacing for the direction of the arrow B and the second electrode 3 is detected from the fourth electrode 82. This displacement of the movable portion electrode 5b for the direction of the arrow B is a pseudo displacement of a displacement due to Coriolis force arising at the movable portion electrode 5b when an angular velocity is applied.

In this embodiment, it is preferable to synchronously detect the detection signal by a frequency of the bias signal applied to between the first electrode 2 and the movable portion electrode 5b and to take out a resonance signal following a frequency component of the bias signal.

Incidentally, the bias signal may be applied to between the third electrode 81 and the movable portion electrode 5b as shown in above-described FIG. 4A to FIG. 8B.

Incidentally, when the microstructure 1 shown in the FIG. 1 is tested in wafer state, a so-called stiction sometimes occurs. The stiction means that the pectinate portion 21 of the first electrode 2 and the pectinate electrode of movable portion 52 of the movable portion electrode 5, for example, stick with each other, therefore their physical contact cannot unstick. When the stiction occurs, measurements can not be performed after that. Moreover, the device itself also becomes defective. Such a stiction sometimes has already occurred before measurement and sometimes occurs from displacement of the movable portion electrode 5 by applying the bias voltage to the movable portion electrode 5 during measurement.

To solve such a stiction, so-called air blow is performed. The air blow means blowing air at some timing of the measurement process of the microstructure 1. The air blow may be performed by using an existing facility such as a prober that is provided for blowing away particles such as chipped lees on a wafer. And the air blow may also be performed by a new facility provided on a probe card. The air blow may be performed to all chips before measurement. The air blow may also be performed to all chips after measurement. Further, the air blow may also be performed to a chip during measurement when the chip is detected to have a possibility of a stiction by a measurement signal, and after that, measurement of the chip is performed again.

Embodiments of the present invention have been described above by referring to figures. However, the present invention is not limited to the embodiments shown in figures. It is possible to make various modifications or deformations to the embodiments shown in the figures within the same scope. of the present invention or within the scope of equivalency. For example, structures of above-mentioned microstructure, fixed electrode portion and movable portion electrode are examples. Therefore, it is possible to modify or deform the structures arbitrarily.

What is claimed is:

1. A displacement measurement apparatus for a microstructure having a fixed electrode including a first electrode and a second electrode and a movable electrode opposed to the fixed electrode, the apparatus comprising:
   a bias generator that applies a bias signal to between the second electrode and the movable electrode after the bias generator has applied the bias signal to between the first electrode and the movable electrode so as to decrease an effect of noise signals associated with a detection signal obtained from between the second electrode and the movable electrode; and
   a detector that detects a signal arising from a resonance of the movable electrode by detecting a difference between a first detection signal obtained from between the second electrode and the movable electrode and a second detection signal obtained from between the first electrode and the movable electrode.

2. The apparatus of claim 1, wherein the bias signal is a direct current, which changes a voltage level from a certain level to another voltage or an alternating current voltage.

3. The apparatus of claim 1, wherein the bias signal is a random signal including a random noise signal, and the first detection signal arises from a resonance of the movable electrode in response to the random signal.

4. The apparatus of claim 1, wherein the bias generator applies the bias signal until the movable electrode starts moving and stops applying the bias signal after the movable electrode has started moving, and
   the detector detects the first detection signal outputted by a damped oscillation of the movable electrode after the application of the bias signal has stopped.

5. The apparatus of claim 1, wherein the first electrode and the second electrode are located separately.

6. The apparatus of claim 1, the microstructure further comprising a third electrode and a fourth electrode,
   wherein the first electrode and the second electrode are located in a first direction with respect to the movable electrode,
   the third electrode and the fourth electrode are located in a second direction that is different from the first direction with respect to the movable electrode,
   the bias generator applies the bias signal to the third electrode and the movable electrode in addition to applying the bias signal to the first electrode and the movable electrode, and
   the detector detects the displacement of the movable electrode in the second direction based on a third detection signal obtained from between the fourth electrode and the movable electrode.

7. The apparatus of claim 6, further comprising:
   a synchronous detector that detects the displacement of the movable electrode in the second direction in synchronization with the bias signal applied to the first electrode and the movable electrode.

8. A displacement measurement method for a microstructure having a fixed electrode including a first electrode and a second electrode and a movable electrode opposed to the fixed electrode, the method comprising the steps of:
   applying a bias signal to between the second electrode and the movable electrode after a bias generator has applied the bias signal to between the first electrode and the movable electrode so as to decrease an effect of noise signals associated with a detection signal obtained from between the second electrode and the movable electrode; and
   detecting a signal arising from a resonance of the movable electrode by detecting a difference between a first detection signal obtained from between the second electrode and the movable electrode and a second detection signal obtained from between the first electrode and the movable electrode.

9. The method of claim 8, wherein the bias signal is a direct current voltage, which changes a voltage level from a certain level to another voltage or an alternating current voltage.

10. The method of claim 9, wherein the alternating current voltage has a frequency that is substantially the same as a resonance frequency of the movable electrode.

11. The method of claim 8, wherein the bias signal is a random signal including a random noise signal, and the first detection signal arises from a resonance of the movable electrode in response to the random signal.

12. The method of claim 8, further comprising the step of:
stopping the application of the bias signal when the movable electrode starts moving after the application of the bias signal,
wherein the first detection signal is outputted by a damped oscillation of the movable electrode after the application of the bias signal has stopped.

13. The method of claim 8, wherein the microstructure is formed on a wafer.

14. A displacement measurement apparatus comprising:
a microstructure having a first fixed electrode including a first electrode and a second electrode and a movable electrode opposed to the first fixed electrode;
a pseudo-microstructure having a second fixed electrode including a third electrode and a fourth electrode, and a pseudo-moving electrode being fixed so as to opposed to the second fixed electrode and arranged to have substantially the same positioning and substantially the same structure as the microstructure;
a bias generator that applies a bias signal to between the first electrode and the movable electrode;
a first detector that extracts a first detection signal including noise signals obtained from between the second electrode and the movable electrode;
a second detector that extracts a second detection signal corresponding to the noise signals, the second detection signal being outputted from between the fourth electrode and the pseudo-moving electrode while the bias signal is applied to between the third electrode and the pseudo-moving electrode; and
a detector for detecting a displacement of the movable electrode by detecting a difference between the first detection signal including noise signals extracted by the first detector and the second detection signal corresponding to the noise signals extracted by the second detector.

15. The method of claim 14, wherein the displacement measurement apparatus is formed on a wafer.

16. A displacement measurement method having a microstructure including a first fixed electrode having a first electrode and a second electrode and a movable electrode opposed to the first fixed electrode, and a pseudo-microstructure having a second fixed electrode including a third electrode and a fourth electrode, a pseudo-moving electrode being fixed so as to opposed to the second fixed electrode and arranged to have substantially the same positioning and substantially the same structure as the microstructure, the method comprising the steps of:
applying a bias signal to between the first electrode and the movable electrode;
extracting a first detection signal including noise signals obtained from between the second electrode and the movable electrode;
extracting a second detection signal corresponding to the noise signals from between the fourth electrode and the pseudo-moving electrode while the bias signal is applied to between the third electrode and the pseudo-moving electrode; and
outputting a displacement signal of the movable electrode by detecting a difference between the first detection signal including noise signals extracted by the first detector and the second detection signal corresponding to the noise signals extracted by the second detector.

* * * * *